United States Patent [19]

Fife et al.

[11] Patent Number: 5,269,307
[45] Date of Patent: Dec. 14, 1993

[54] MEDICAL ULTRASONIC IMAGING SYSTEM WITH DYNAMIC FOCUSING

[75] Inventors: Michael J. Fife, Denver; Dennis R. Dietz, Littleton; William M. Glenn, Evergreen; Richard W. Denny, Littleton, all of Colo.

[73] Assignee: Tetrad Corporation, Englewood, Colo.

[21] Appl. No.: 830,433

[22] Filed: Jan. 31, 1992

[51] Int. Cl.⁵ .................. A61B 8/00; G01N 29/00
[52] U.S. Cl. ........................ 128/661.01; 73/625
[58] Field of Search .................. 128/661.01; 73/625-626

[56] References Cited

U.S. PATENT DOCUMENTS

| | | | |
|---|---|---|---|
| 4,116,229 | 9/1978 | Pering | 73/626 |
| 4,140,022 | 2/1979 | Maslak | 73/626 |
| 4,154,113 | 5/1979 | Engeler | 73/626 |
| 4,155,260 | 5/1979 | Engeler et al. | 73/626 |
| 4,224,829 | 9/1980 | Kawabuchi et al. | 73/626 |
| 4,550,607 | 11/1985 | Maslak et al. | 73/626 |
| 4,671,294 | 6/1987 | Magnin et al. | 73/861.25 X |
| 4,787,392 | 11/1988 | Saugeon | 128/661.01 |
| 4,829,491 | 5/1989 | Saugeon et al. | 367/103 |
| 4,896,287 | 1/1990 | O'Donnell et al. | 364/754 |
| 4,983,970 | 1/1991 | O'Donnell et al. | 364/178 X |
| 5,111,695 | 5/1992 | Engeler et al. | 128/661.01 X |
| 5,172,343 | 12/1992 | O'Donnell | 128/661.01 X |

Primary Examiner—Francis Jaworski
Attorney, Agent, or Firm—Sheridan Ross & McIntosh

[57] ABSTRACT

The present invention provides a medical ultrasonic imaging device with dynamic focusing that is capable of operating at high frequencies and providing high resolution. One embodiment of the device includes a plurality of transducers, arranged in either a linear or curved array, for converting an ultrasonic signal received by the device into a plurality of electrical signals. This embodiment of the device also includes a plurality of vector modulators for phase-shifting the plurality of electrical signals to achieve fine focusing. A delay line array is further included in the device that allows each of the phase-shifted electrical signals to be delayed by a selected amount to achieve coarse focusing of the electrical signals. Further included in the device is a summer of summing the time delayed and phase-shifted electrical signals to provide focused image data.

42 Claims, 6 Drawing Sheets

FIG. IB
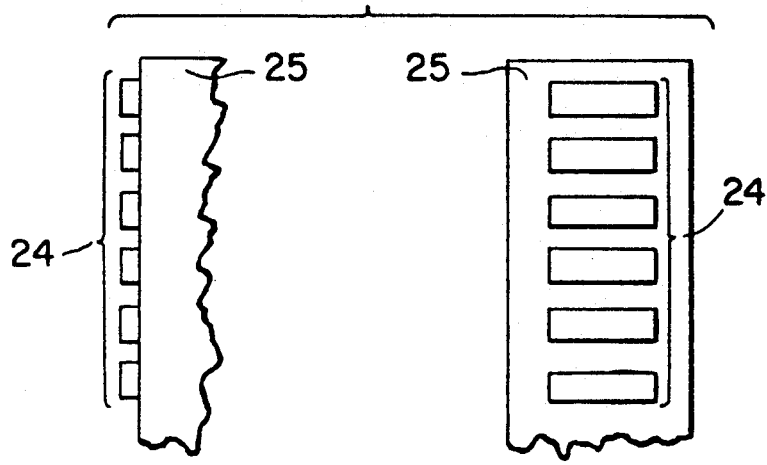
FIG. IC
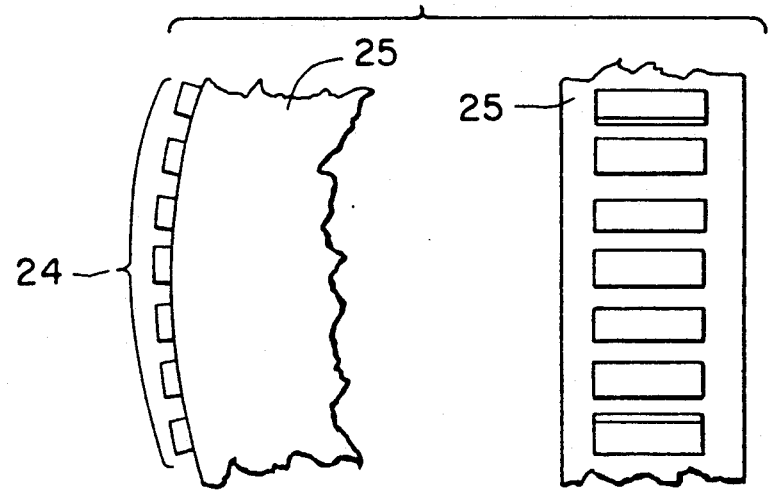

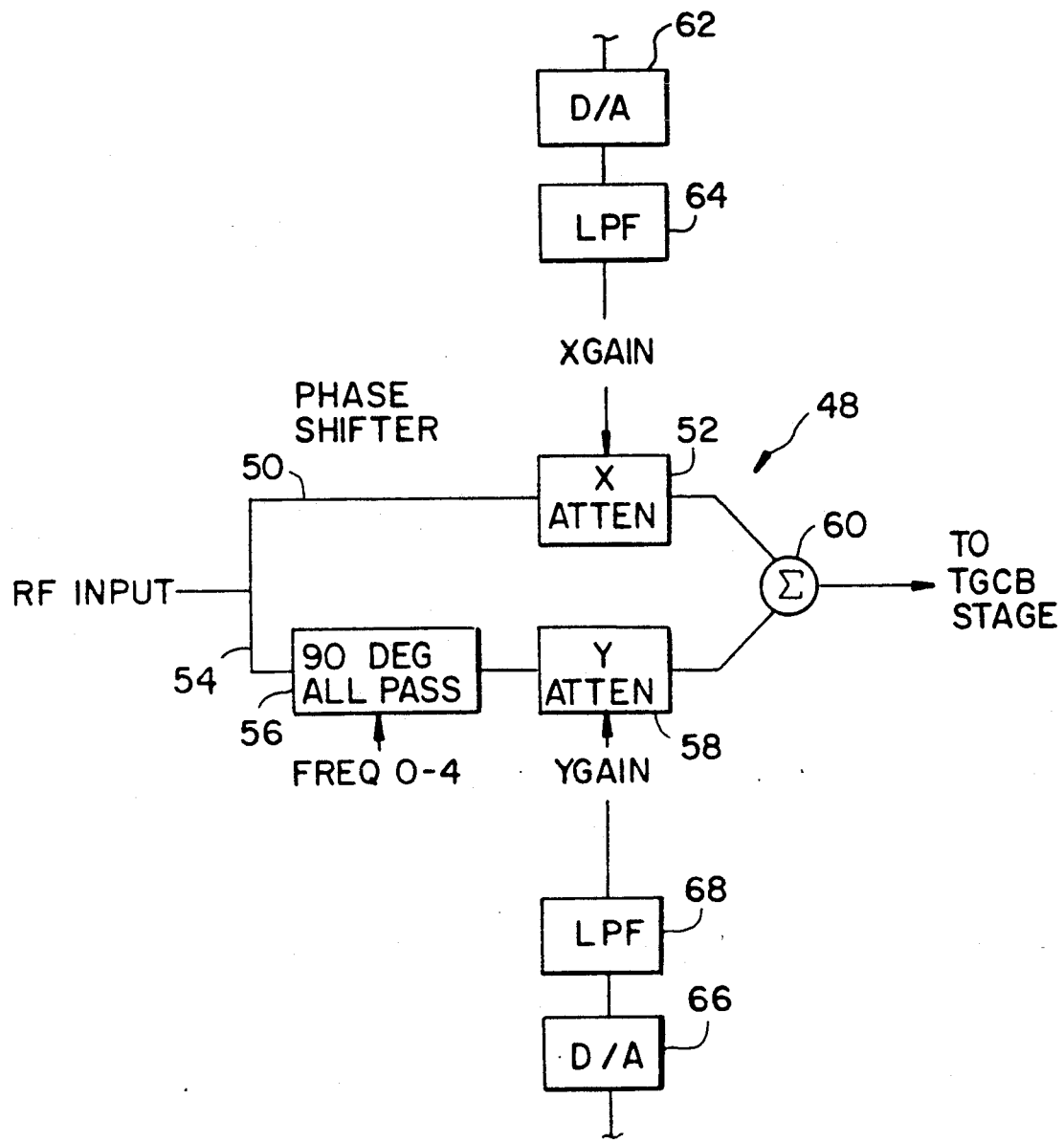

MEDICAL ULTRASONIC IMAGING SYSTEM WITH DYNAMIC FOCUSING

BACKGROUND OF THE INVENTION

1. Field of the Invention

The present invention relates to medical ultrasound imaging and, in particular, to a medical ultrasound imaging system and method that provides dynamic focusing at high frequencies of operation and with high phase resolution.

2. Description of the Related Art

Medical ultrasound imaging systems are used to obtain information on the structural characteristics, such as shape and location, of human or animal tissue by applying an ultrasonic signal to the tissue and then analyzing the ultrasonic signal after it has interacted with the tissue to determine the various characteristics of the tissue. More specifically, operation of the typical medical ultrasonic imaging system includes the generation of an ultrasonic signal using an array of piezo-electric devices and applying the ultrasonic signal to the tissue of interest, such as the liver. As the ultrasonic signal propagates through the tissue, the tissue reflects the ultrasonic signal to varying degrees depending on the characteristics of the tissue. For example, denser tissue, such as a tumor, may reflect more of the ultrasonic signal than healthy tissue. The reflected ultrasonic signal is generally received by the same array of piezo-electric transducers that generated the ultrasonic signal and converted into a plurality of electrical signals that have substantially the same frequency as the received ultrasonic signal. These electrical signals are processed to recover the information on the tissue that they contain and to also place them in a form that can be displayed on a monitor or other output device for analysis by a physician or technician.

The processing of the plurality of electrical signals generally involves phase-shifting and/or time delaying the plurality of electrical signals with respect to one another to account for various operational parameters. For example, the phase-shifting and/or delaying of the electrical signals can account for, among other things, the angle of the wave front of the ultrasonic wave with respect to the array of piezo-electric transducers and the shape of ultrasonic wave. For instance, if the transmitted ultrasonic signal is a planar wave whose wave front is at an angle to the plane of a linear array of piezo-electric transducers, then the reflected signal produced by the tissue with which the wave front of the ultrasonic signal is in contact at any one moment in time will return to and come into contact with the elements of the piezo-electric array at different times. Since the reflected ultrasonic signal reaches the elements of the piezo-electric array at different times, the elements of the piezo-electric array produce electrical signals representative of the tissue that produced the reflected ultrasonic wave at different times. Consequently, to develop image data on the tissue structure with which the wave front of the ultrasonic signal is engaged at any one point in time, the electrical signals produced by the array of piezo-electric transducers must be appropriately phase-shifted and/or delayed in time with respect to one another. The process of phase-shifting and/or delaying the electrical signals with respect to one another is commonly referred to as "focusing and/or steering" the electrical signals and the structure for accomplishing the "focusing and/or steering" is commonly referred to as a beamformer. In some types of beamformers, phase-shifting is used to accomplish "fine" focusing that involves phase shifts of no more than 360° or one cycle of the electrical signal and time delaying of the electrical signal is used to accomplish "coarse" focusing that is characterized by delays of one or more cycles of the electrical signal.

In addition to the "focusing" of electrical signals, the quality of the image data can also be affected by weighting the amplitudes of the various electrical signals with respect to one another to apodize or "shade" the image data. This can be useful in reducing sidelobes and improving dynamic range in the resulting image.

There is a wide variety of electronic system architectures used for beamforming. This includes systems that process the electronic signals simply by switching time delays in the paths of all the electronic signals. Others convert the analog signals to a digital format, using A/D converters, and then create the appropriate delays in shift registers or memories. Another type of beamformer employs a combination of heterodyning circuitry, to adjust phase, and time delaying circuitry. These beamformers have distinct disadvantages in size and cost when processing signals at higher operating frequencies, for example in the range of 2.5 to 15 MHz.

Presently, one of the most commonly employed analog-based beamformers employs heterodyning to accomplish phase-shifting of the electrical signals. Heterodyning of one of these electrical signals involves mixing or multiplying the electrical signal, which has a frequency substantially identical to that of the received ultrasonic signal, with a mixing signal of a different frequency to produce a signal with a frequency spectrum that is down-shifted from the frequency of the original electrical signal. The down-shifting allows componentry with reduced bandwidth or operating range requirements to be used. By switching between mixing signals of the same frequency but of a different phase, phase-shifting of the electrical signal to achieve "fine" focusing is also accomplished. Delaying of the electrical signals to achieve "coarse" focusing is typically accomplished with some sort of delay line structure.

In a medical ultrasound imaging system that employs heterodyning, amplitude weighting of the electrical signals to apodize or shade the signals produced by each of the piezo-electric transducers is accomplished by a different piece of circuitry from the mixer or heterodyne circuitry.

Presently, there are several applications for medical ultrasound imaging systems that current analog-based medical ultrasound imaging systems, and especially those that employ heterodyning, are not thought capable of addressing at a reasonable cost. Specifically, there is a need for a medical ultrasound imaging system that is capable of producing high quality image data from the electrical signals produced by a linear or curved array of transducers and by operating at a high frequency, typically in the range of ten megahertz or more, and doing so at a reasonable cost. The advantage of using a linear or curved transducer array is that the ultrasonic signal produced by the array can be electronically "steered" so that the mechanical "steering" required in, for example, annular arrays is avoided. Typical linear and curved transducer arrays require a large number of elements, tens to hundreds of elements, for adequate performance. Consequently, such systems must be capable of processing many electrical signals to produce an image. High frequency operation allows high quality data on small tissue structures or organs to be achieved. Specifically, there is an inverse relationship between the size of the tissue or organ of interest and the frequency of the signal that can be employed to obtain image data, due to the filtering characteristics of animal tissue. For example, if the tissue of interest is relatively small, then a higher frequency ultrasonic can be used. The use of a higher frequency signal, in turn, allows high quality image data to be realized. Presently, there is a need to provide image data on tissue structures that are relatively small, such as bile ducts, fallopian tubes, and small coronary arteries and veins. Unfortunately, there is significant expense involved in high frequency heterodyne systems in making the small phase adjustments in an electrical image signal that are necessary to realize high quality image data. This expense is further amplified in heterodyne systems that use multi-element linear or curved transducer arrays.

A further drawback associated with heterodyne based medical ultrasound imaging systems that operate at high frequencies and that switch from one mixing signal to another mixing signal to produce a phase-shifted signal is that switching transients which have significant frequency components at or near the frequency of the ultrasonic signal are produced. These switching transients can adversely affect the information contained in the electrical signals produced by the piezo-electric transducers. Moreover, elimination of the switching transients typically requires the implementation of sophisticated and costly filtering techniques.

Yet another drawback associated with medical ultrasound imaging systems that accomplish phase-shifting by switching between mixing signals of different phases is that only discrete or step-wise phase shifts are possible. For example, one known medical ultrasound imaging system provides phase-shifts in steps of 22.5°. Due to this limitation, such systems exhibit limited phase resolution that adversely impacts image quality.

A high quality image also generally requires the ability to amplitude-weight the electrical signals to apodize or "shade" the electrical signals produced by each of the piezo-electric transducers in the array. Achieving apodization in heterodyne based medical ultrasound imaging systems typically requires the use of programmable attenuators, one for each electrical signal, that are also relatively expensive. Consequently, for heterodyne systems that use multi-element linear or curved transducer arrays, significant expense is typically in involved providing apodization capability.

Additionally, there is a need for a medical ultrasound imaging system that can compensate for changes in the center of frequency of the received ultrasonic signal. The center frequency of the received ultrasonic signal is the frequency around which much of the componentry in a beamformer is designed. Deviations from the center frequency adversely affect the performance of the beamformer and the resulting image data. Animal tissue exponentially attenuates the ultrasonic signals applied to it at a rate that is frequency dependent and, in so doing, shifts the center frequency of the received ultrasonic signals. Further, this shift in the center frequency increases as the ultrasonic signal propagates further into the tissue of interest. Consequently, the shift in the center frequency becomes especially troublesome when the imaging system operates at high frequencies. Compensation for shifts in the center frequency requires expensive circuitry in heterodyned systems, especially if high phase resolution is also required and the center frequency of several electrical signals must be adjusted, as is typically required when multi-element linear and curved transducer arrays are utilized.

There is yet a further need for a medical ultrasound imaging system that can be readily adapted to operate at different frequencies. As previously mentioned, there is an inverse relationship between the frequency of the ultrasonic signal that can be used and the size of the tissue or organ of interest. As a result, higher frequencies are appropriate for smaller organs or tissue and lower frequencies are more appropriate for larger organs or tissue. Based on this, it is desirable that a medical ultrasound imaging system be adaptable to operate at different frequencies so that organs or tissue of different sizes can be imaged.

Moreover, there is a need for a medical ultrasound imaging system that can compensate for systematic errors, i.e., errors in amplitude and phase that are attributable to the components that comprise the system. For instance, the delay line length may not be appropriate for the specific delay required of it and, as a result, adversely affect the quality of the resulting image data. In this case as well as in the cases of other sources of systematic error, it is desirable to be able to compensate for these errors to improve the quality of the resulting image data.

Further, there is a need for a medical ultrasound imaging system that can process signals that have interacted with tissue very close to the transducer array. Typically, such signals are so strong that processing circuitry is incapable of processing them in a reliable manner.

Further, there is a need for a medical ultrasound imaging system that reduces the number of parts to, in turn, reduce the part cost and assembly cost as well as improve the reliability of the resulting medical ultrasound imaging system.

SUMMARY OF THE INVENTION

The present invention provides a medical ultrasound imaging system with dynamic focusing that has been designed to address several of the deficiencies in medical ultrasound imaging systems that implement a time delay multiplexer, a digital delay system, or a heterodyning beamformer. Specifically, one object of the present invention is to provide a medical ultrasound imaging system that is capable of processing the high frequency electrical signals produced by a linear or curved array of transducers to realize high quality image data at a reasonable cost.

Another object of the present invention is to provide a medical ultrasound imaging system that can provide continuous phase-shifting of the electrical image signals and thereby improve the quality of the image data at a reasonable cost.

Yet a further object of the present invention is to provide a medical ultrasound imaging system that reduces or avoids the use of switching circuitry which cause switching transients.

A further object of the present invention is to provide a medical ultrasound imaging system that is capable of amplitude weighting of the electrical signals produced by a linear or curved transducer array to apodize or "shade" the electrical signals at a reasonable cost.

Yet another object of the present invention is to provide a medical ultrasound imaging system that can be used to compensate for changes in the center frequency of the ultrasonic signals after they have interacted with the tissue or organ of interest at a reasonable cost.

An additional object of the present invention is to provide a medical ultrasound imaging system that is capable of operating at different frequencies so that the system can be adapted to image different types of tissue.

Yet a further objective of the present invention is to provide a medical ultrasound imaging system that can be used to compensate for systematic errors in the system and thereby realize improved image data and make possible the use of lower cost componentry.

Additionally, an object of the present invention is to provide a medical ultrasound imaging system that, at least with respect to the beamformer, exhibits a reduced cost relative to medical ultrasound imaging systems that employs multiplexed time delay, digital delay, or heterodyning beamformers.

Still another object of the present invention is to reduce the number of parts necessary to realize the system to reduce the cost and increase the reliability of the resulting system.

These and other objects are realizable with the medical ultrasound imaging system of the present invention that, in one embodiment, includes a linear or curved array of transducers for converting an ultrasonic signal, after it has interacted with the tissue of interest, into a plurality of electrical signals, and a carrier for positioning the array adjacent to the tissue of interest. The medical ultrasound imaging system of the present invention further includes an apparatus for use in dynamically focusing the electrical signal that includes a vector modulator for, among other things, producing a desired phase-shift in at least one of the electrical signals produced by transducer array.

In one embodiment of the invention, the vector modulator includes a device for using the electrical signal provided by the transducer device to produce a first signal and a second signal that is phase-shifted by approximately 90° with respect to the first signal. The vector modulator further includes devices for selectively altering the amplitude and polarity of the first and second signals. Further included in the vector modulator is an apparatus for summing the two signals after their respective amplitudes and polarity have been selectively altered to produce a sum signal whose phase has been altered by up to 360° with respect to the electrical signal originally applied to the vector modulator.

In another embodiment of the invention, the vector modulator includes an apparatus that permits one of a plurality of operating frequencies for the vector modulator to be selected. This ability to select the operating frequency of the vector modulator allows the imaging system to be adapted for the imaging of tissues of different sizes.

In yet a further embodiment of the medical ultrasound imaging system of the present invention, the apparatus for use in dynamically focusing the electrical signal includes an array of delay lines that permits various delays to be applied to an electrical signal. This also allows the system to be used with signals from different arrays operating at different frequencies.

BRIEF DESCRIPTION OF THE DRAWINGS

FIGS. 1B and 1C illustrate a linear transducer array and a curved transducer array, respectively;

FIG. 2 is a detailed block diagram of the vector modulator used in the embodiment of the invention illustrated in FIG. 1 and which provides for continuous phase-shifting and amplitude weighting, among other things, of an applied signal;

DETAILED DESCRIPTION OF THE PREFERRED EMBODIMENTS

Figure 1A:
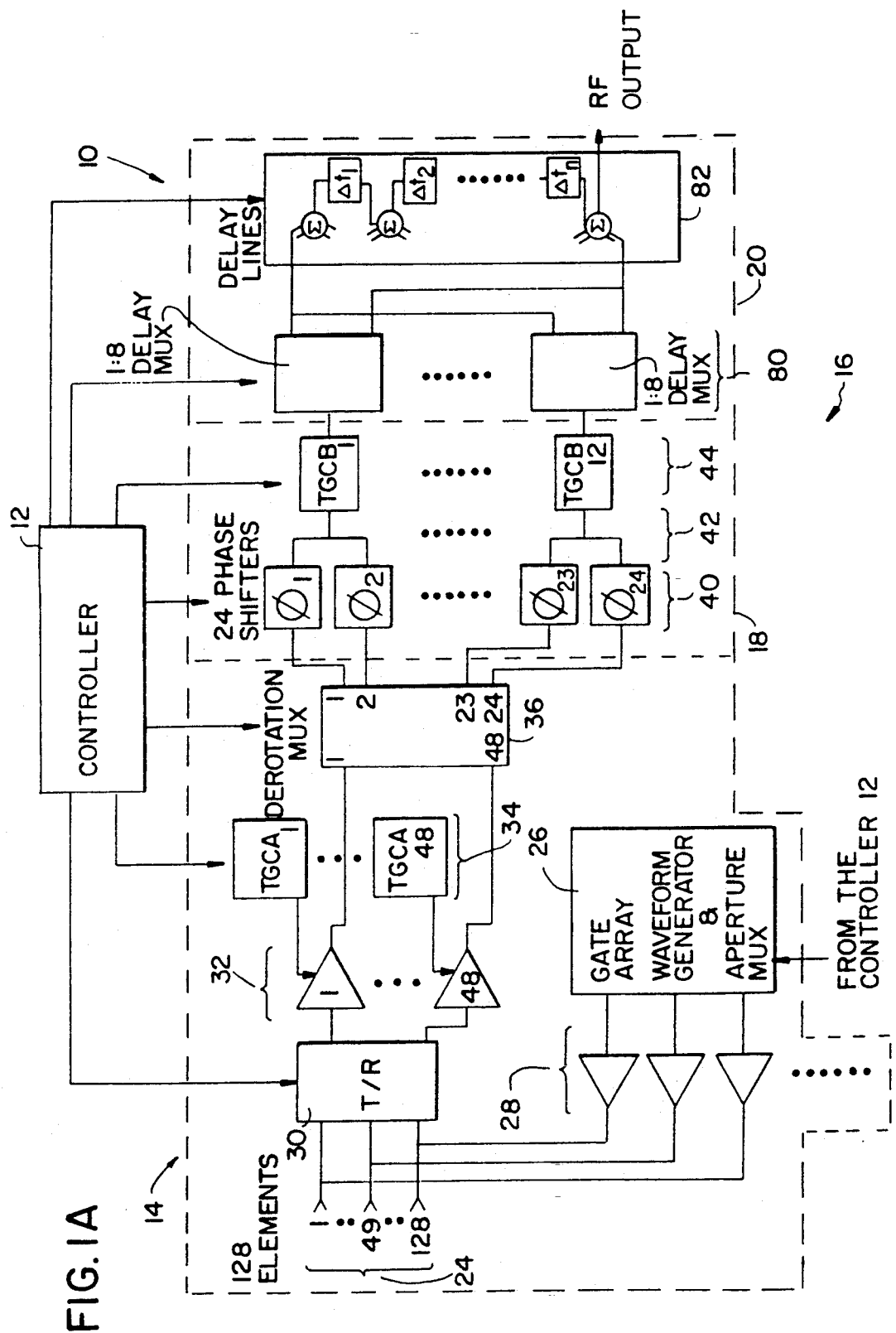
FIG. 1A is a block diagram of an embodiment of the ultrasonic imaging device of the present invention.

FIG. 1A illustrates an embodiment of the medical ultrasound imaging system 10 of the present invention. As a matter of convenience, the medical ultrasound imaging system will hereinafter be referred to simply as system 10 The system 10 includes a controller 12 for directing and coordinating the operation of transmitter/receiver circuitry 14 and focusing circuitry 16. The transmitter/receiver circuitry 14 operates, under the direction of the controller 12, to either produce an ultrasonic signal that can be applied to animal tissue or to receive an ultrasonic signal after it has interacted with the tissue of interest and to convert the received ultrasonic signal into an electrical signal that can be processed to provide image data suitable for application to an output device, such as a television monitor. The focusing circuitry 16 includes phase-shifting circuitry 18 for phase-shifting the electrical signals representative of at least a portion of a received ultrasonic signal to achieve, among other things, "fine" focusing of the electrical signals. Also included in the focusing circuitry 16 is time delay circuitry 20 for delaying the electrical signals that are representative of at least a portion of a received ultrasonic signal to achieve a "coarse" focusing of the electrical signals.

The basic operation of the system 10 is initiated by the controller 12 causing the transmitter/receiver circuitry 14 to produce an ultrasonic signal that is applied to the tissue or organ for which image data is desired. As the transmitted ultrasonic signal propagates through the tissue or organ of interest, the tissue or organ of interest reflects portions of the ultrasonic signal that are representative of the tissue back toward the transmitter/receiver circuitry 14. Consequently, after the controller 12 has caused the transmitter/receiver circuitry 14 to produce an ultrasonic signal, the controller 12 places the transmitter/receiver circuitry 14 in a receiving mode to detect and convert at least a portion of the reflected ultrasonic signal into an electrical signal. The electrical signal is then applied to the focusing circuitry 16 to appropriately phase-shift and/or time delay the electrical signal and then sum the electrical signal with other electrical signals to produce a focused image data signal that can be digitized and stored in memory and later converted to suitable display format for a monitor or other output device from which a physician or technician can analyze the image data.

The controller 12 includes an appropriately programmed digital computer with an interface which permits operator interaction. Alternatively, the controller 12 can be realized by a strictly hardware implementation or a combination of hardware with an appropriately programmed computer.

With reference to FIGS. 1B and 1C, the transmitter/receiver circuitry 14 includes an array of 128 piezo-electric transducer elements 24, which is hereinafter referred to as transducer array 24, for use in converting an electrical signal into an ultrasonic signal that can be applied to animal tissue and for use in converting an ultrasonic signal after it has interacted with animal tissue into a plurality of electrical signals that are representative of the received ultrasonic signal. The transducer array 24 is operatively connected to a carrier 25 that is suitable for positioning the transducer array 24 adjacent to the tissue or organ of interest. Typical carriers include a laparoscope, an endoscope, a hand-held package, a guidewire, and a catheter. The piezo-electric transducer elements are positioned with respect to one another so as to form a linear transducer array, as illustrated in FIG. 1B, or a curved transducer array, as illustrated in FIG. 1C.

The transmitter/receiver circuitry 14 further includes a gate array 26 that, under the direction of the controller 12, produces the electrical signal or signals that are subsequently applied to the transducer array 24 which then converts the electrical signal or signals into the ultrasonic signal that is applied to the tissue of interest. The gate array 26 includes a programmable waveform generator that allows the controller 12 to select the frequency and shape of the electrical signal or signals that are provided to the transducer array 24. In the illustrated embodiment, signals in the range of 2.5–15 MHz are generated by the programmable waveform generator. This frequency range permits tissues with a correspondingly wide range of sizes to be imaged. Further included in the gate array 26 is an aperture multiplexer that allows the controller 12 to select which ones of the piezo-electric elements that comprise the transducer array 24 receive the electrical signal or signals produced by the waveform generator and when these piezo-electric transducers receive the electrical signal or signals produced by the waveform generator. By being able to control which of the piezo-electric transducers of the transducer array 24 receive the electrical signal or signals and when these piezo-electric transducers receive the electrical signals, the angle of the transmitted ultrasonic signal with respect to the transducer array 24 can be controlled. The ability to control the angle of the transmitted ultrasonic signal is typically referred to as "steering".

The transmitter/receiver circuitry 14 further includes an array of 128 amplifiers, hereinafter referred to as amplifier array 28, for increasing the signal strength of the electrical signal or signals output by the gate array 26 before application to the 128 piezo-electric transducers comprising the transducer array 24.

Further included in the transmitter/receiver circuitry 14 is a transmit/receiver (T/R) switch 30 that allows the controller 12 to place the transducer array 24 in a transmission mode in which the transducer array 24 is used to produce the ultrasonic signal that is applied to the tissue of interest or in a reception mode in which the transducer array 24 is used to convert a received ultrasonic signal into an electrical signal. More specifically, when the T/R switch 30 is in the transmission mode, the electrical signal or signals produced by the gate array 26 and amplified by the amplifier array 28 are applied to one or more of the piezo-electric transducers elements of the transducer array 24 to produce the ultrasonic signal that is applied to the tissue or organ of interest. Further, when the T/R switch 30 is in the transmission mode, signals are prevented from reaching the circuitry that follows the T/R switch 30 and is used to process the electrical signals representative of a received ultrasonic signal. When the T/R switch 30 is in the transmission mode, this circuitry is protected from damage. When in the reception mode, the T/R switch 30 receives the electrical signals received by each of the piezo-electric transducers elements of the transducer array 24 upon being excited by an ultrasonic signal that has interacted with the tissue or organ of interest. Moreover, in the reception mode, the T/R switch 30 multiplexes the 128 electrical signals produced by the corresponding 128 piezo-electric transducers elements onto forty-eight output channels. This effectively limits the aperture of the transducer array 24 to forty-eight of the 128 piezo-electric transducers elements. This size aperture has been found suitable for most applications. However, if a different size aperture is required, the T/R switch 30 and subsequent circuitry can, of course, be appropriately modified.

Also included in the transmitter/receiver circuitry 14 is an array of forty-eight variable gain preamplifiers 32, hereinafter referred to as preamplifier array 32, for amplifying the forty-eight electrical signals output by the T/R switch 30 prior to further processing. The gain of each of the preamplifiers in the preamplifier array 32 is defined by a time-gain-compensation circuit that varies the gain of the preamplifier to compensate for various attenuation levels at various tissue depths according to directions form the controller. All of the time-gain-compensation circuits for varying the gains of the preamplifiers in the preamplifier array 32 are hereinafter collectively referred to as the first time-gain-compensation array 34 or TGCA array 34.

Generally, the first TGCA array 34 is used to compensate for attenuation of the ultrasonic signal as it propagates through the tissue of interest. More specifically, as the ultrasonic signal propagates through the tissue of interest, the ultrasonic signal becomes increasingly attenuated by the tissue. Consequently, the strength of the transmitted ultrasonic signal decreases the further the reflecting tissue is away from the transducer array 24 that produced the transmitted ultrasonic signal. Likewise, the strength of the reflected ultrasonic signal decreases as it propagates back toward the transducer array 24. The first TGCA array 34 allows the controller 12 to adjust the signal strength of the electrical signals depending upon the depth of the tissue that produced the ultrasonic signal received by the transducer array 24 relative to the transducer array 24. Stated another way, the first TGCA array 34 allows the controller 12 to adjust the amplitude of the electrical signals being processed according to the time elapsed between the time the ultrasonic signal was applied to the tissue of interest and the time at which the reflected ultrasonic signal from the tissue at a particular depth relative to the transducer array 24 is received.

Also included in the transmitter/receiver circuitry 14 is a derotation multiplexer 36 for summing pairs of the forty-eight electrical signals output by the preamplifier array 32 to produce twenty-four symmetrical pairs of signals that are input to the focusing circuitry 16.

The twenty-four electrical signals output by the derotation multiplexer 34 are applied to the focusing circuitry 16, which operates under the direction of the controller 12, to produce the necessary phase-shift using the phase-shift circuitry 18 and/or time delay using the time delay circuitry 20 in each of the electrical signals to produce focused image data.

The phase-shifting circuitry 18 includes twenty-four phase shifters 40, which are hereinafter referred to as the phase-shifter array 40. The phase-shifter array 40 operates under the direction of the controller 12 so that each of the phase-shifters causes a corresponding one of the electrical signals output by the derotation multiplexer 36 to be phase-shifted by an appropriate amount for producing focused image data. Notably, the phase-shifter array 40 operates on electrical signals that have substantially the same frequency as the received ultrasonic signal, which is approximately 2.5–15 MHz in the illustrated embodiment.

Also included in the phase-shifting circuitry 18 are twelve summing junctions 42, which are hereinafter referred to as the summing junction array 42, for summing pairs of output signals from the phase-shifter array 40 to simplify the time delay circuitry 20. A second tuneable gain control amplifier array 44 or TGCB array 44 amplifies the twelve electrical signals provided by the summing junction array 42 by an amount specified by the controller 12. Typically, the TGCB array 44 is used by the controller 12 to further compensate for time or depth related attenuation of the ultrasonic signal received by the transducer array 24.

FIG. 2 illustrates a vector modulator 48 that forms one of the phase-shifters in the phase-shifter array 40 and is used to selectively phase-shift one of the electrical signals applied to it by the derotation multiplexer 36, among other things. The vector modulator 48 operates by producing a first electrical signal of the same phase as the applied electrical signal and a second electrical signal that is phase-shifted by substantially 90° with respect to the applied electrical signal. By selectively attenuating the first and second electrical signals and then summing the attenuated signals, a signal of a desired phase-shift with respect to the applied signal can be produced. The vector modulator 48 includes an I-channel 50 for producing the first electrical signal and then selectively attenuating the first electrical signal. Selective attenuation, which includes selectively varying the amplitude as well as the polarity, of the first electrical signal is achieved with an "X"-attenuator circuit 52 that is responsive to an "X-gain" signal derived from the controller 12. The vector modulator 48 also includes a Q-channel 54 for producing the second electrical signal that is phase-shifted by 90° with respect to the first electrical signal in the I-channel 50. The Q-channel 54 includes a 90° allpass filter 56 for producing a 90° phase-shift in the electrical signal applied to the vector modulator 48. An alternative to the allpass filter 56 is a delay line. The 90° allpass filter 56 can be directed by the controller 12 to operate in any one of five frequency bands. This allows the system 10 to be used to image different types of tissue that require ultrasonic signals of different frequencies to be imaged. The Q-channel 54 further includes a "Y"-attenuator circuit 58 for selectively attenuating the second electrical signal according to a "Y-gain" signal derived from the controller 12. A summation junction 60 sums the signals produced by the I-channel 50 and the Q-channel 54 to produce a sum signal that is phase-shifted with respect to the applied signal by an amount that is dependent upon the degree to which the first and second signals have been attenuated by the "X"-attenuator circuit 52 and the "Y"-attenuator circuit 58, respectively.

The "X"-gain signal and the "Y"-gain signal are both analog signals that allow a continuous variation, as opposed to a step-like variation, of the phase-shift of the signal applied to the vector modulator 48 to be achieved. When the controller 12 provides a digital signal to control the operation of the "X"-attenuator circuit 52 and/or the "Y"-attenuator circuit 58, the vector modulator 48 employs digital-to-analog circuits and lowpass filters to process the digital signal output by the controller 12 into the analog "X"-gain and "Y"-gain signals that are applied to the "X"-attenuator circuit 52 and the "Y"-attenuator circuit 58, respectively. Specifically, a first D/A circuit 62 and a first lowpass filter 64 are used to process a digital signal output by the controller 12 into the analog "X-gain" signal that is used to control the "X"-attenuator circuit 52 to achieve a continuous phase shift of the input signal. Similarly, a second D/A circuit 66 and a second lowpass filter 68 are used to convert a digital signal output by the controller 12 into the analog "Y"-gain signal that is applied to the "Y"-attenuator circuit 58.

Figure 3:
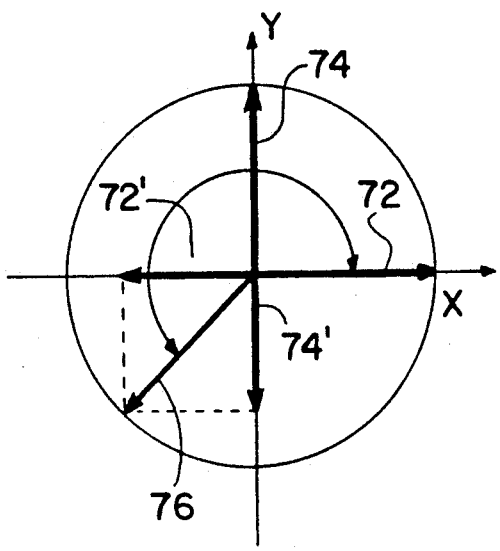
FIG. 3 illustrates the ability of a vector modulator employed in the embodiment of the invention illustrated in FIG. 1 to phase-shift an electrical signal.

FIG. 3 illustrates the phase-shifting ability of the vector modulator 48. Specifically, the first vector 72 represents the signal applied to the vector modulator 48 as well as the first signal in the I-channel 50 prior to attenuation by the "X"-attenuator circuit 52. A second vector 74 represents the signal present in the Q-channel 54 prior to attenuation by the "Y"-attenuator circuit 58. By appropriately attenuating the first signal with the "X"-attenuator circuit 52 and the second signal with the "Y"-attenuator circuit 58, a desired phase shift can be achieved. In this case, the desired phase shift is 225°. This phase shift is achieved by appropriately attenuating the first and second signals and then summing the resulting signals. The attenuation of the first electrical signal by the "X"-attenuator circuit 52 is represented by first vector 72' and the attenuation of the second electrical signal by the "Y"-attenuator circuit 58 is represented by a second vector 74'. In this case, attenuation of both the first vector 72 and the second vector 74 involves a reduction in amplitude as well as a change in polarity. The sum of the first and second electrical signals after they have been attenuated by the "X"-attenuator circuit 52 and the "Y"-attenuator circuit 58, respectively, is represented by the sum vector 76. As FIG. 3 illustrates, the sum vector 76 is phase-shifted by 225° with respect to the first vector 72, which is representative of the signal applied to the vector modulator 48.

Figure 4:
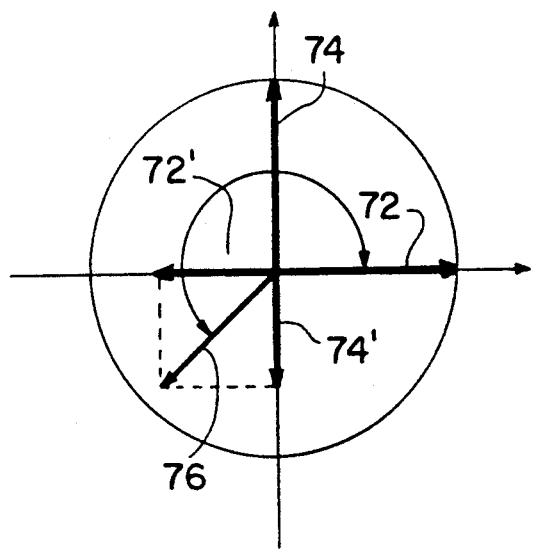
FIG. 4 illustrates the ability of the vector modulator employed in the embodiment of the invention illustrated in FIG. 1 to amplitude weight as well as phase-shift an electrical signal.

FIG. 4 illustrates the amplitude weighting capability of the vector modulator 48. In this case, a phase shift of 225° and a decrease in amplitude is achieved. The first vector 72 and the second vector 74 again respectively represent the first and second electrical signals in the I-channel 50 and the Q-channel 54, respectively, prior to attenuation. The first vector 72' and the second vector 74' represent the first and second electrical signals after attenuation by the "X"-attenuator circuit 52 and the "Y"- attenuator circuit 58, respectively. In this case, attenuation of the first and second electrical signals again involves a polarity change as well as an amplitude change. However, the change in amplitude has been selected so that the resultant sum signal has a lesser amplitude than the signal applied to the vector modulator 48. The sum vector 76' is representative of the sum signal output by the summing junction 60. As can be seen from FIG. 4, the sum vector 76' has a lower amplitude than the first vector 72, which is representative of the signal applied to the vector modulator 48. Consequently, by appropriately attenuating the first and second signals in each of the vector modulators 48 that comprise the phase-shifter array 40, amplitude weighting of the resulting sum signals with respect to one another can be achieved. While attenuators are used in the illustrated embodiment of the vector modulator 48, amplifiers can also be used for the same purpose.

The vector modulator 48 further allows the controller 12 to be configured to compensate for systematic errors in phase or amplitude. For example, if a delay line in the time delay circuitry is of an incorrect length for providing a specified delay, then the controller 12 can be programmed to provide the appropriate "X-gain" and "Y-gain" signals to make a phase adjustment that compensates for the incorrect length in the delay line. Further, the vector modulator 48 also allows the controller to provide the appropriate "X"-gain and "Y"-gain signals to compensate for shifts in the center frequency of the received ultrasonic signal from the transmitted ultrasonic signal.

The time delay circuitry 20 provides the appropriate time delay to each of the twelve phase-shifted signals output by the phase-shifting circuitry 18 and sums the resulting signals to produce focused image data that can be provided to a monitor or other output device for viewing by a physician or technician. The time delay circuitry 20 includes a 12×8 delay line multiplexer for multiplexing the twelve phase-shifted signals provided by the phase-shifting circuitry 18 onto eight lines which form the inputs to a delay line array 82. The delay line array 82 provides the appropriate delay to each of the applied electrical signals and then sums the delayed electrical signals to produce a focused image signal. The delay line array 82 includes a first bank of delay lines 84, a switch array 86, and a second bank of delay lines 88 that allows the controller 12 to multiplex each of the eight signals output by the delay multiplexer 80 between the first bank of delay lines 84 and the second bank of delay lines 88 to appropriately time delay each of these signals. The appropriate time delay for an electrical signal is generally dependent upon the frequency of the electrical signal. The phase-shifted and time delayed electrical signals are summed at output node 90.

Figure 6:
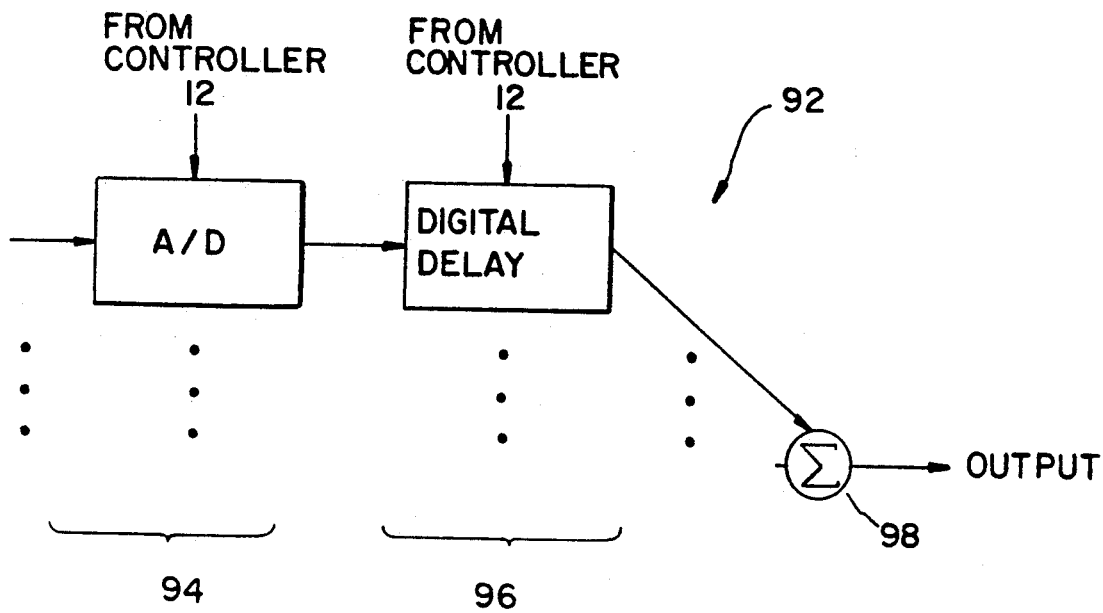
FIG. 6 illustrates an alternate time delay circuit to the time delay circuit shown in the embodiment of the invention illustrated in FIG. 1.

An alternative time delay circuitry 92 to the time delay circuitry 20 is illustrated in FIG. 6. The alternative time delay circuitry 92 includes a plurality of analog-to-digital (A/D) converters 94, hereinafter A/D array 94, for converting the analog electrical signals output by the phase-shifting circuitry 18 into digital signals under the direction of the controller 12. The alternative time delay circuitry 92 also includes a plurality of digital delays 96, hereinafter digital delay array 96, for time delaying the digital signals output by the A/D array 94, according to directions provided by the controller 12. The digital delays comprising the digital delay array 96 can be realized by using digital memory elements that can store digital signals for periods of time that are defined by the controller 12. Further included in the alternative time delay circuitry 92 is a summing junction for summing the time delayed digital signals provided by the digital delay array 96 to produce a focused digital image signal.

Figure 7:
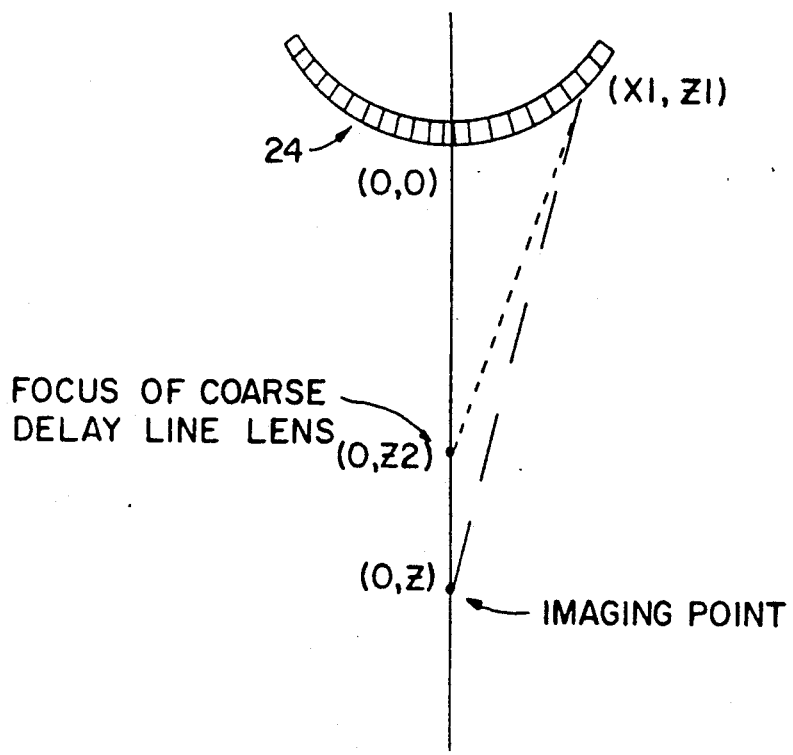
FIG. 7 illustrates a curved transducer array and is used to demonstrate how the controller of the present invention controls the vector modulator and time delay array to achieve focusing and amplitude weighting.

With reference to FIG. 7, the following explains how both the time delay circuitry 20 and the vector modulators 48 are controlled by the controller 12. Gain from apodization and the phase from focusing are combined resulting in the X and Y control inputs to the vector modulator 48.

The time delay and/or phase-shift required for focusing and steering are determined by the controller 12 according to the following steps. The first step is to calculate the time of flight differences from the elements of the array 24 to the imaging position, here shown at position (O,z). This is done by first calculating the time of flight of a reference element, for example the center element of the array 24, and then subtracting that from the time of flight of all the other elements. Time of flight is simply the geometric length divided by the speed of sound, and this can be calculated exactly or through an accurate approximation of the geometric formula. A time of flight difference is determined as follows:

$$\text{Tdif}((x1,z1),(O,z)) = (\sqrt{(x1)^2+(z-z1)^2}-z)/c \quad (1)$$

where (O,O) is the position of the reference element; (x1,z1) is the position of any other element; (O,z) is the imaging position; and c is the velocity of sound.

This time of flight is then converted to phase by multiplying the time of flight by the center frequency of the waveform, a number which can be adjusted with depth due to the attenuation of tissue. This subtraction is shown in the following equation.

$$\text{Phase1}(x1,z1) = 2*\pi*\text{Frequency}*\text{Tdif} \quad (2)$$

Next, the appropriate time delay is determined. The function of the time delay circuitry 20 is to create a coarse lens which, for the case shown in FIG. 7 above, is set to the depth (O,z2). The time of flight difference for any element positioned at (x1,z1) relative to the reference element for this case is calculated as shown in Equation 1. We will call this Delayin&, where $$\text{Delayin\&} = \text{Tdif}((x1,z1), (O,z2)) \text{ using equation 1.} \quad (3)$$

Figure 5:
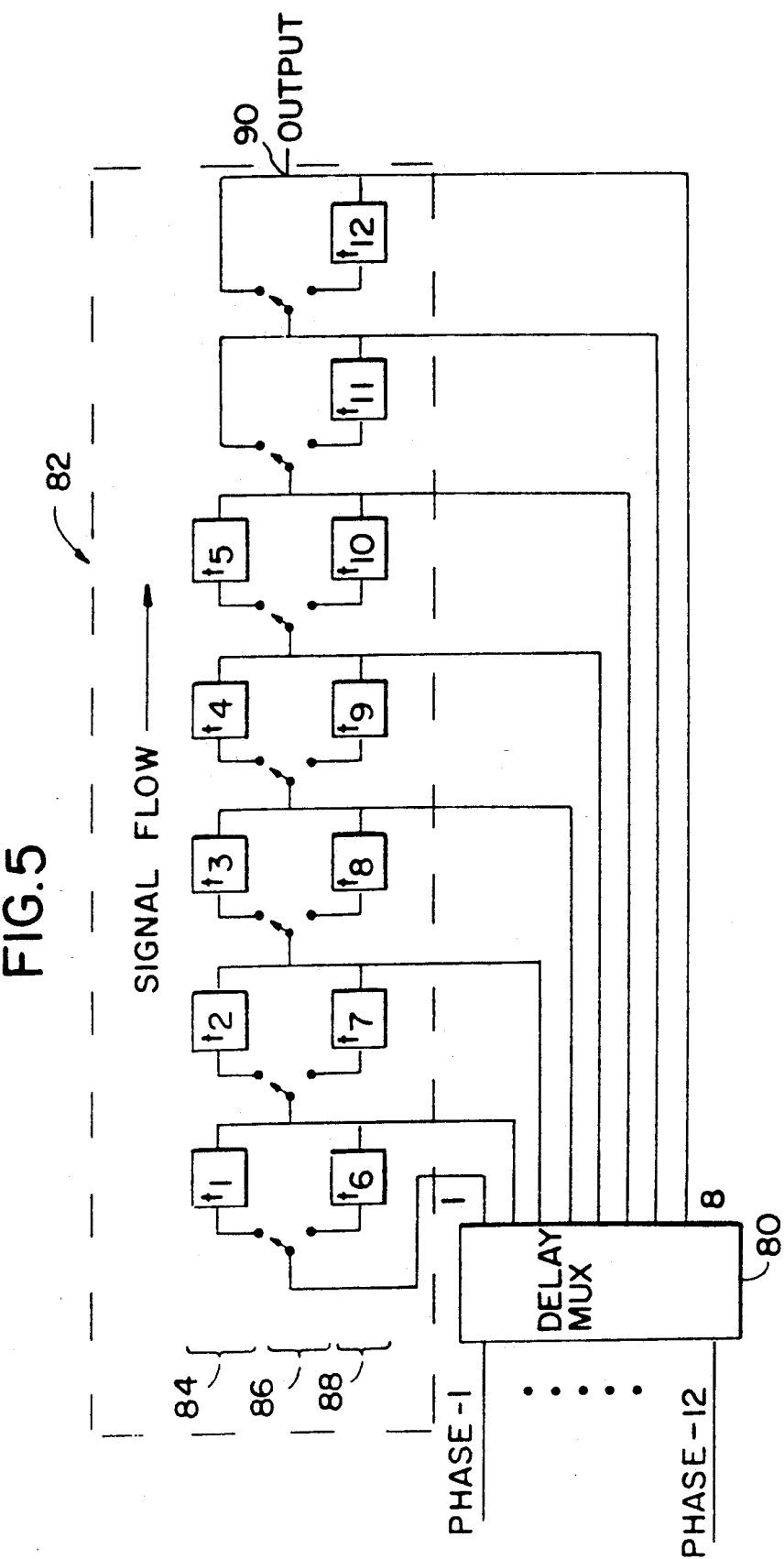
FIG. 5 is a detailed block diagram of the delay multiplexer, delay line array, and summing junction shown in FIG. 1.

The Delayin& is then applied to subroutine DelMuxSet, which is for the case of a one bank version of the delay line array 82 but can be readily extended to the two bank case illustrated in FIG. 5:
SUB DelMuxSet (Delayin&, Idelcfg, DelaySwitch%, DelayCorrect&) STATIC SHARED IDelayLines&(), IdlineError&() DIM Delay&(8)

```
signal flow -->
- [t0] - [t1] - [t2] - [t3] - [t4] - [t5] - [t6] -
   7    6    5    4    3    2    1    0
```

| | |
|---|---|
| IDelayLines&(i,j) | For a given configuration, j, the i delay settings are saved, as shown above. |
| IdlineError&(i,j) | This is the corresponding delay line error as measured during board test. Nominally 0. |
| DelaySwitch% | This is the switch position, 0 to 7. |
| DelayCorrect | This is the total delay from the input switch position to the output, including the delay line error. |

IF Delayin& < 0 THEN PRINT "Error - Delayin<0 in DelMuxSet"

```
FOR i = 0 TO 7
    Delay&(i) = IDelayLines&(i, Idelcfg) +
        IdlineError&(i, Idelcfg)
NEXT i
DelaySum& = 0
difmin& = 100000    for the first pass, this must be large
                    enough for any entry
FOR i = 0 TO 7
    DelaySum& = DelaySum& + Delay&(i)
    dum1& = ABS(Delayin& - DelaySum&)
    IF dum1& < difmin& THEN
        difmin& = dum1&
        DelaySwitch% = i
        DelayCorrect& = DelaySum&
    END IF
NEXT i
END SUB
```

The subroutine DelMaxSet illustrates one way in which the appropriate delay lines of the time delay circuitry 20 can be selected for the transducer element at (x1,z1). Note that the nominal values for the delay lines, IDelayLines&() along with the measured errors from these lines, IdlineError&(), are used in choosing the best fit. The resulting delay for the transducer element located at (x1,z1) is the value called DelayCorrect& in this subroutine. This is not the time of flight difference to that point but rather the best fit of the actual delay line values to that point.

The signal from the element at (x1,z1) will be directed through the appropriate delay lines of the delay line array 82 and be delayed by an amount DelayCorrect& as derived for this example in the manner shown in the subroutine DelMuxSet. The phase corresponding to this delay is then subtracted from Phase1(x1, z1) shown above and the difference, Phase(x1,z1), is the amount of phase correction that will be done in the vector modulator 48. The subtraction is shown by the following equation:

$$\text{Phase}(x1,z1) = \text{Phase1}(x1,z1) - 2*\pi*\text{Frequency}*\text{DelayCorrect\&} \quad (4)$$

Apodization is a gain or phase adjustment applied to all of the elements of the array 24 to change the resulting radiation pattern of the array 24. Apodization of a given element will be called Apod(x1,z1) for the gain of the element at that position in the array.

In the subroutine ApodizeRTHC, several examples are given of the relative amplitude weighting of the array elements for several functional forms of apodization. Any other functional form can be generated in this way, including functions that would also add to the Phase term, Phase(x1, z1), shown above. The SUB ApodizeRTHC is as follows:

SUB ApodizeRTHC (Narray, iee, Irthc, Npow, Apod()) STATIC This subroutine produces an apodization function, Apod(i), for the array. Several types can be used, selected by Irthc, and several versions of each selected by Npow. Inputs:

| | Narray | Number of elements in a half aperture 0 to 23 |
|---|---|---|
| | Irthc | 1, Rectangle; 2, Triag.; 3, Hanning; 4, Cos; 5, Raise Cos |
| | Npow | For cases 4 & 5, Npow is the power of the Cosine |
| | Iee | 0 for even aperture, 1 for odd aperture |
| Outputs: | | |

```
Apod( )    Apodization function, -1 to 1
           The number of elements, Nsub( ), is
           referenced to 0 not 1!
Even Aperture:
    Xarg = ( j + ½)/(Narray+1) * 0.5 ranging from
           0+ to + 0.5- across the aperture. This is used
           in several of the apodization functions below.
Odd Aperture:
    Xarg = (j)/(Narray+1) * 0.5
Nar2 = Narray
IF iee = 0 THEN Even = 1
IF iee = 1 THEN Even = 0
π = 3.14159
RECTANGULAR APODIZATION
IF Irthc = 1 THEN
    FOR i = 1 TO Nar2
        Apod(i) = 15
    NEXT i
END IF
TRIANGULAR APODIZATION
IF Irthc = 2 THEN
    FOR i = 0 TO Nar2
        Xarg = .5 * (i + Even * .5) / (Narray + 1)
        Apod(i) = 1 - (.9 * Xarg) / .5
        Apod(i) = CINT(15 * Apod(i))
        PRINT Xarg, Apod(i)
    NEXT i
END IF
    INPUT "?", x
    HANNING WINDOW
This is an even version of the Hanning over the aperture
IF Irthc = 3 THEN
    FOR i = 0 TO Nar2
        Xarg = .5 * (i + Even * .5) / (Narray + 1)
        Apod(i) = .5 + .5 * COS(2 * Xarg * π)
        Apod(i) = CINT(15 * Apod(i))
    NEXT i
IF Irthc = 4
    FOR i = 0 TO Nar2
        Xarg = .5 * (i + Even * .5) / (Narray + 1)
        Apod(i) = COS(Xarg * π)
        Apod(i) = CINT(15 * Apod(i))
    NEXT i
END IF
If Npow > 0 then set discrete apodization steps
If Npow > 0 THEN
    FOR i = 1 TO Nar2
        Apod(i) = .4343 * 20 * LOG(Apod(i))
        IF Npow = 1 THEN Ndum = 3
        IF Npow = 2 THEN Ndum = 6
        Nxdb = CINT(Apod(i) / Ndum)
        Apod(i) = 10 ^ (Nsdb * Ndum / 20)
    NEXT i
END IF
END SUB
```

Conversion of gain and phase into control signals for the vector modulator. In order to bring an element of array at (x1,z1) properly into focus at a position (O,z) in FIG. 7, the vector modulator 48 must provide both the proper gain and phase. Gain will be the Apod (x1,z1) described above. Phase will be the negative of Phase(x1,z1) given above to cancel out the remaining phase error and make the transducer element at (x1,z1) have the same phase as the reference element at (O,O) in FIG. 7.

In this system, phase is important only in a relative sense. All of the elements should have equal phase to the reference element or else a relative phase determined by the apodization function. This can be accomplished with the methods described here.

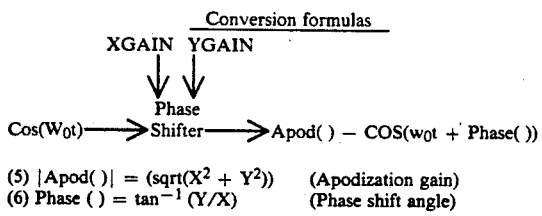

Conversion formulas $$\text{XGAIN} \downarrow \quad \text{YGAIN} \downarrow$$

$$\cos(W_0 t) \longrightarrow \text{Phase Shifter} \longrightarrow \text{Apod}() - \cos(w_0 t + \text{Phase}())$$

(5) $|\text{Apod}()| = (\sqrt{X^2 + Y^2})$    (Apodization gain)
(6) $\text{Phase}() = \tan^{-1}(Y/X)$    (Phase shift angle)

Where X and Y refer to X and Y attenuation levels for the vector modulator 48. The levels range from $-1.0$ to $1.0$ in value, and are determined by XGAIN and YGAIN control voltages.

Having described the components of the system 10, it is now necessary to describe the operation of the system 10. The operation of the system 10 initially involves calibration of the delay line array 82 to determine the actual delays being provided by each of the delay lines comprising the delay line array 82 and providing this information to the controller 12 so that the vector modulators 48 that comprise the phase-shifter array 40 can be directed by the controller 12 to compensate for inaccuracies in delay line length that result in the delay lines providing time delays that are different from the specified delay times. Other sources of systematic error can also be calibrated and the resulting data provided to the controller 12. The controller 12 compensates for these sources of error by appropriately adjusting the "X-gain" and "Y-gain" signals provided to the vector modulators comprising the phase-shifter array 38 during operation.

After the delay lines have been calibrated and those results stored, the controller 12 determines the frequency of operation and physical dimensions of the array and then calculates the appropriate "X" and "Y" weights for the vector modulators 48 of the phase shifter array 40. These "X" and "Y" weights are stored in memory on the controller 12 and then provided to the D/A converters 62 and 66. These weights can include apodization, or amplitude weighting, of the signals form the various elements of the array 40. For example, a Hanning or cosine type of apodization could be employed. Additionally, the controller 12 places the T/R switch 30 in the transmit mode so that the electrical signals produced by the gate array 26 will not be processed by the focusing circuitry 16. Further, the controller programs the 90° allpass filter 56 in each of the vector modulators 48 comprising the phase-shifter array 40 to process electrical signals at the selected frequency.

At this point, the transducer array 24 is positioned adjacent to the tissue of interest and the controller 12 causes the gate array 26 to provide the selected electrical signal to the appropriate piezo-electric elements of the transducer array 24 to produce the electrical signal that propagates through the tissue of interest. After the ultrasonic signal has been produced and applied to the tissue of interest, the controller 12 places the T/R switch 30 in the reception mode so that the ultrasonic signals reflected by the tissue of interest and received by the transducer array 24 can be processed to provide focused image data on the tissue of interest. Further, the T/R switch 30, under the direction of the controller 12, multiplexes the 128 electrical signals produced by the 128 piezo-electric elements of the transducer array 24 and representative of a received electrical signal onto the forty-eight output lines that are applied to the amplifier array 28. The amplifier array 28 amplifies the forty-eight signals provided by the T/R switch 30 according to the signals provided by the TGCA array 34. As previously mentioned, the controller 12 generally uses the tuneable gain control amplifiers in the TGCA array 34 to compensate for time or depth attenuation of the ultrasonic signal by the tissue of interest. The amplified signals produced by the amplifier array 28 are provided to the derotation multiplexer 34. Under the direction of the controller 12, the derotation multiplexer 34 sums pairs of the forty-eight amplified signals provided by the amplifier array 28 to produce twenty-four symmetric pairs of signals that are provided to the focusing circuitry 16.

The twenty-four signals output by the derotation multiplexer 34 are initially applied to the phase-shifting circuitry 18 of the focusing circuitry 16 to achieve, among other things, the appropriate phase-shift in each of the twenty-four electrical signals. As previously mentioned, the vector modulators 48 that comprise the phase-shifter array 40 can be controlled by the "X-gain" and "Y-gain" signals provided by the controller 12 to achieve a desired phase shift for focusing in each of the signals provided by the derotation multiplexer 36. Moreover, the "X-gain" and "Y-gain" signals provided by the controller 12 can be adjusted to apodize the signals output by the vector modulators 48 according to a selected function. Additionally, the "X-gain" and "Y-gain" signals can be further adjusted to compensate for deviations in the center frequency of the received ultrasonic signal from the transmitted ultrasonic signal as well as to compensate for systematic errors, such as inaccuracies in the length of the delay lines comprising the delay line array 82. Furthermore, the "X"-attenuator circuit 52 and "Y"-attenuator circuit 58 are responsive to analog signals and, as a result, allow a continuous phase shift to be realized that avoids switching transients and facilitates the production of high quality image data.

After the twenty-four electrical signals have been appropriately phase-shifted by the phase-shifter array 40, pairs of the phase-shifted signals are summed by the summing junction array 42 to produce twelve signals that are provided to the TGCB array 44. The TGCB array 44 operates pursuant to instructions provided by the controller 12 and is generally used to address time or depth related attenuation of the ultrasonic signal as it propagates through the tissue of interest. The TGCB array 44 provides twelve signals to the time delay circuitry 20.

The time delay circuitry 20 provides the appropriate time delay to each of the applied twelve signals and then sums the signals to produce focused image data that can be provided to a monitor or other output device for viewing by a physician or technician. More specifically, the controller 12 causes the delay multiplexer 80 to multiplex the twelve signals onto eight output lines that are then applied to the delay line array 82, whose switch array 88 has been set by the controller 12 to provide the appropriate time delay to each of the applied signals. The signals provided to the delay line array 82 are delayed by the appropriate amount of time with respect to one another and then summed at the output node 90 to produce focused image data.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A medical ultrasound imaging device with dynamic focusing and steering, comprising:
   a carrier adapted for positioning adjacent to animal tissue;
   a plurality of transducers for transducing an ultrasonic signal into a plurality of analog electrical signals, wherein said plurality of transducers are operatively connected to said carrier and form one of a linear array of transducers and a curved array of transducers; and
   means for use in dynamically focusing said plurality of analog electrical signals that includes a vector modulator for use in receiving at least one of said plurality of analog electrical signals, phase-shifting said at least one of said plurality of analog electrical signals to produce a phase-shifted analog electrical signal, and outputting said phase-shifted analog electrical signal to perform at least a portion of the dynamic focusing of said at least one of said plurality of analog electrical signals.

2. A medical ultrasound imaging device, as claimed in claim 1, wherein:
   said carrier includes one of the following: a laparoscope, a guide wire, a catheter, a hand-held package, and an endoscope.

3. A medical ultrasonic imaging device, as claimed in claim 1, wherein:
   said vector modulator is adapted to process said at least one of said plurality of analog electrical signals at substantially the same frequency as said ultrasonic signal.

4. A medical ultrasonic imaging device, as claimed in claim 1, wherein:
   said means for use in dynamically focusing includes means for use in selecting one of a plurality of frequencies of operation, wherein said selected frequency of operation substantially corresponds to the frequency of said ultrasonic signal.

5. A medical ultrasonic imaging device, as claimed in claim 1, wherein:
   said vector modulator includes means for using said at least one of said plurality of analog electrical signals in producing a first analog electrical signal and a second analog electrical signal;
   means for altering the phase of one of said first analog electrical signal and said second analog electrical signal so that said first analog electrical signal is approximately 90° out of phase with said second analog electrical signal;
   means for selectively altering the polarity and selectively attenuating the amplitude of both said first analog electrical signal and said second analog electrical signal; and
   means for summing said first analog electrical signal and said second analog electrical signal after selective alteration and selective attenuating to produce a sum analog signal that is substantially said one of said plurality of analog electrical signals phase-shifted by an amount of up to 360°.

6. A medical ultrasonic imaging device, as claimed in claim 1, wherein:
   said vector modulator includes means for use in substantially continuously altering the phase of said one of said plurality of analog electrical signals.

7. A medical ultrasonic imaging device, as claimed in claim 1, wherein:
   said means for use in dynamically focusing includes a delay line for use in the coarse focusing said at least one of said plurality of analog electrical signals.

8. A medical ultrasonic imaging device, as claimed in claim 1, wherein:
   said means for use in dynamically focusing includes means for use in coarse focusing said at least one of said plurality of analog electrical signals that includes a first bank of delay lines, a second bank of delay lines, and means for multiplexing said at least one of said plurality of analog electrical signals between said first bank of delay lines and said second bank of delay lines.

9. A medical ultrasonic imaging device, as claimed in claim 1, wherein:
   said means for use in dynamically focusing is operable in a frequency range of approximately 2.5 MHz to 15 MHz.

10. A medical ultrasonic imaging device, as claimed in claim 1, wherein:
    said vector modulator includes control means for providing an apodization signal that relates to a desired amplitude weighting of said at least one of said plurality of analog electrical signals so that said vector modulator substantially simultaneously imparts a desired amplitude weighting and a desired phase-shift to said at least one of said plurality of signals and outputs an apodized phase-shifted analog electrical signal.

11. A medical ultrasonic imaging device, as claimed in claim 1, wherein:
    said vector modulator includes control means for providing a systematic error correction signal that relates to at least one of a desired phase-shifted and a desired amplitude weight of said at least one of said plurality of analog electrical signals to compensate for a predetermined source of error associated with componentry in the device.

12. A medical ultrasonic imaging device, as claimed in claim 1, wherein:
    said vector modulator includes a time gain compensation amplifier for use in varying the amplitude of said at least one of said plurality of analog electrical signals over time prior to any other amplification of said at least one of said plurality of analog electrical signals.

13. A medical ultrasonic imaging device, as claimed in claim 1, wherein:
    said means for use in dynamically focusing includes means for use in selectively delaying said phase-shifted analog electrical signal to produce a phase-shifted and time delayed analog electrical signal, wherein said means for use in selectively delaying is adapted to process said phase-shifted analog electrical signal at substantially the same frequency as said ultrasonic signal.

14. A medical ultrasonic imaging device with dynamic focusing and steering, comprising:
a carrier adapted for positioning adjacent to animal tissue;
a plurality of transducers for transducing an ultrasonic signal into a plurality of electrical signals, wherein said plurality of transducers are operatively connected to said carrier and form one of a linear array of transducers and a curved array of transducers; and
means for use in dynamically focusing said electrical signals that includes a vector modulator for use in phase-shifting at least one of said plurality of electrical signals to perform at least a portion of the dynamic focusing of the electrical signal, said vector modulator includes a processor for providing a digital signal relating to a desired phase shift of said one of said plurality of electrical signals, a digital-to-analog converter for receiving said digital signal and converting said digital signal into an analog signal, and a low-pass filter for smoothing said analog signal.

15. A medical ultrasonic imaging device with dynamic focusing, comprising:
a carrier adapted for positioning adjacent to animal tissue;
means, operatively connected to said carrier, for use in transducing an ultrasonic signal into an analog electrical signal, said means for use in transducing includes a first transducer for use in converting a first portion of said ultrasonic signal into a first analog electrical signal portion of said analog electrical signal and a second transducer for use in converting a second portion of said ultrasonic signal into a second analog electrical signal portion of said analog electrical signal, wherein said first transducer and said second transducer form one of a linear transducer array and a curved transducer array; and
means for use in dynamically focusing said electrical signal that includes vector modulator means for use in receiving said first and second analog electrical signals, selectively phase-shifting said first and second analog electrical signals, producing first and second phase-shifted analog electrical signals and outputting said first and second phase-shifted analog electrical signals, and means for use in selectively delaying said first and second phase-shifted analog electrical signals to produce first and second phase-shifted and time delayed analog electrical signals.

16. A medical ultrasonic imaging device, as claimed in claim 15, wherein:
said vector modulator means includes means for summing said first and second phase-shifted analog electrical signals.

17. A medical ultrasonic imaging device, as claimed in claim 15, wherein:
said means for use in providing a time delay includes means for summing said first and second phase-shifted and time delayed analog electrical signals.

18. A medical ultrasonic imaging device, as claimed in claim 15, wherein:
said means for use in providing a time delay includes an analog-to-digital converter and means for use in performing a digital delay.

19. A medical ultrasonic imaging device, as claimed in claim 15, wherein:
said vector modulator includes means for use in providing a substantially continuous phase shift.

20. A medical ultrasonic imaging device, as claimed in claim 15, wherein:
said means for use in providing a time delay includes a first bank of discrete delay lines, a second bank of discrete delay lines, and means for selecting to which of said first and second banks of discrete delay lines said first and second phase shifted analog electrical signals are applied.

21. A medical ultrasonic imaging device, as claimed in claim 15, wherein:
said vector modulator includes control means for providing an apodization signal that relates to a desired amplitude weighting of said first and second analog electrical signals so that said vector modulator substantially simultaneously imparts a desired amplitude weighting and a desired phase-shift to said first and second analog electrical signals and outputs first and second, apodized and phase-shifted analog electrical signals.

22. A medical ultrasonic imaging device, as claimed in claim 15, wherein:
said vector modulator includes control means for providing a systematic error correction signal that relates to at least one of a desired phase-shift for said first and second analog electrical signals and a desired amplitude weight for said first and second analog electrical signals to compensate for a predetermined source of error associated with componentry in the device.

23. A medical ultrasonic imaging device, as claimed in claim 15, wherein:
said vector modulator includes time gain compensation amplification means for varying the amplitude of said first and second analog electrical signals over time prior to any other amplification of said first and second electrical signals.

24. A medical ultrasonic imaging device, as claimed in claim 15, wherein:
said vector modulator includes digital means for providing a digital signal that is representative of a desired phase-shift in said first and second analog electrical signals.

25. A medical ultrasonic imaging device, as claimed in claim 24, wherein:
said vector modulation includes a digital-to-analog converter for receiving said digital signal and converting said digital signal into an analog signal.

26. A medical ultrasonic imaging device, as claimed in claim 25, wherein:
said vector modulator includes a filter for smoothing said analog signal to produce a smoothed analog signal that can be used to obtain a substantially continuous phase shift.

27. A medical ultrasonic imaging device, as claimed in claim 15, wherein:
said vector modulator includes means for processing said first and second analog electrical signals at substantially the same frequency as said received ultrasonic signal.

28. A medical ultrasonic imaging device with dynamic focusing, comprising:
a carrier adapted for positioning adjacent to animal tissue;

means, operatively connected to said carrier, for use in transducing an ultrasonic signal into an electrical signal and including a first transducer for use in converting a first portion of said ultrasonic signal into a first portion of said electrical signal and a second transducer for use in converting a second portion of said ultrasonic signal into a second portion of said electrical signal, wherein said first and second transducers form one of a linear array and a curved array;

means for providing a control signal that is related to at least two of the following: a desired phase-shift of said first portion of said electrical signal for use in fine focusing thereof, a desired phase-shift or amplitude weight of said first portion of said electrical signal for use in compensating for a predetermined source of error associated with compensating in the device, and a desired amplitude weighting of said first electrical signal for use in apodization thereof; and means for use in dynamically focusing said electrical signal that includes a vector modulator means for use in substantially continuously phase-shifting and amplitude weighting said first portion of said electrical signal according to said control signal;

wherein said vector modulator includes means for using said first portion of said electrical signal to produce a first electrical signal and a second electrical signal that is approximately 90° out of phase with and substantially identical to said first electrical signal, means for selectively attenuating the amplitude and selectively changing the polarity of said first electrical signal to produce a first altered electrical signal and means for selectively attenuating the amplitude and selectively changing the polarity of said second electrical signal to produce a second altered electrical signal, and means for summing said first altered electrical signal and said second altered electrical signal to produce a sum signal that is phase-shifted by up to 360° from said first portion of said electrical signal, said means for use in dynamically focusing further including time delay means for use in time delaying said sum signal to achieve coarse focusing, said time delay means includes a first delay line, a second delay line, and means for selecting to which of said first delay line and second delay line said sum signal is applied to produce a time delayed and phase-shifted signal, said means for use in dynamically focusing further includes means for summing said time delayed and phase-shifted signal with other time delayed and phase-shifted signals.

29. A method for dynamically focusing an electrical signal that is representative of an ultrasonic signal that has interacted with animal tissue, comprising the steps of:

providing a first transducer and a second transducer, wherein said first transducer and said second transducer form one of a linear array and a curved array;

receiving an ultrasonic signal;

converting a first portion of said ultrasonic signal into a first analog electrical signal using said first transducer;

converting a second portion of said ultrasonic signal into a second analog electrical signal using said second transducer; and vector modulating said first analog electrical signal to produce a first phase-shifted analog electrical signal, wherein said step of vector modulating said first analog electrical signal provides at least a portion of the dynamic focusing of said first analog electrical signal.

30. A method, as claimed in claim 29, wherein:
said step of vector modulating includes using said first analog electrical signal to produce a first signal and a second signal that is substantially identical to said first signal.

31. A method, as claimed in claim 30, wherein:
said step of vector modulating includes altering the phase of one of said first signal and said second signal so that said first signal is approximately 90° out of phase with said second signal.

32. A method, as claimed in claim 29, further including the step of:
applying said first phase-shifted analog electrical signal to a time delay means to produce a first phase-shifted and time delayed analog electrical signal.

33. A method, as claimed in claim 32, wherein:
said step of applying includes summing said first phase-shifted and time delayed analog electrical signal with other phase-shifted and time delayed analog electrical signals.

34. A method, as claimed in claim 29, further including the step of:
multiplexing said first phase-shifted analog electrical signal between a first bank of time delay means and a second bank of time delay means to produce a first phase-shifted and time delayed analog electrical signal.

35. A method, as claimed in claim 29, wherein:
said step of vector modulating includes substantially simultaneously amplitude weighting and phase-shifting said first analog electrical signal to apodize said first analog electrical signal and produce an apodized, phase-shifted analog electrical signal.

36. A method, as claimed in claim 29, wherein
said step of vector modulating includes at least one of phase-shifting and amplitude weighting said first analog electrical signal to compensate for a predetermined source of error in the componentry used to accomplish the dynamic focusing of the first analog electrical signal.

37. A method, as claimed in claim 29, wherein:
said step of vector modulating includes using a digital signal to define a desired phase-shift.

38. A method, as claimed in claim 29, wherein:
said step of vector modulating occurs at substantially the same frequency as said received ultrasonic signal.

39. A method, as claimed in claim 29, wherein:
said step of vector modulating includes substantially continuously altering the phase-shift of said first analog electrical signal.

40. A method for dynamically focusing an electrical signal that is representative of an ultrasonic signal that has interacted with animal tissue, comprising the steps of:

providing a first transducer and a second transducer, wherein said first transducer and said second transducer form one of a linear array and a curved array;

receiving an ultrasonic signal;

converting a first portion of said ultrasonic signal into a first electrical signal using said first transducer;

converting a second portion of said ultrasonic signal into a second electrical signal using said second transducer; and vector modulating said first electrical signal to produce a first phase-shifted electrical signal, wherein said step of vector modulating said first electrical signal provides at least a portion of the dynamic focusing of said first electrical signal, said step of vector modulating includes using said first electrical signal to produce a first signal and a second signal, said step of vector modulating includes altering the phase of one of said first signal and said second signal so that said first signal is approximately 90° out of phase with said second signal, said step of vector modulating includes selectively attenuating each of said first signal and said second signal to produce, respectively, a first attenuated signal and a second attenuated signal.

41. A method, as claimed in claim 40, wherein:

said step of selectively attenuating includes selectively changing the polarity of each of said first signal and said second signal.

42. A method, as claimed in claim 41, wherein:

said step of vector modulating includes summing said first attenuated signal and said second attenuated signal to produce a sum signal that is substantially said electrical signal phase-shifted by an amount of up to 360°.

* * * * *